United States Patent [19]
Worley

[11] 3,910,904
[45] Oct. 7, 1975

[54] 2-SUBSTITUTED METHYLENE-3,4-DIHYDRO-3-OXO-2H-1,4-BENZOTHIAZINE-4-ACETIC ACID AND ESTERS THEREOF

[75] Inventor: Jimmy Weldon Worley, Creve Coeur, Mo.

[73] Assignee: Monsanto Company, St. Louis, Mo.

[22] Filed: Aug. 12, 1974

[21] Appl. No.: 496,507

[52] U.S. Cl. .............................. 260/243 R; 71/91
[51] Int. Cl.$^2$ ........................................ C07D 279/16
[58] Field of Search ............................ 260/243 R

[56] References Cited

UNITED STATES PATENTS

| | | | |
|---|---|---|---|
| 3,733,321 | 5/1973 | Krapcho | 260/243 |
| 3,746,706 | 7/1973 | Krapcho | 260/243 |

*Primary Examiner*—John M. Ford
*Attorney, Agent, or Firm*—Arnold H. Cole

[57] ABSTRACT

Certain 2-substituted methylene-3,4-dihydro-3-oxo-2H-1,4-benzothiazine-4-acetic acetic acid and esters thereof have been found to be useful in the regulation of plant growth.

10 Claims, No Drawings

2-SUBSTITUTED METHYLENE-3,4-DIHYDRO-3-OXO-2H-1,4-BENZOTHIAZINE-4-ACETIC ACID AND ESTERS THEREOF

This invention relates to a new class of organic chemical compounds. More particularly, this invention is concerned with novel heterocyclic compounds which can generally be designated as derivatives of 3,4-dihydro-3-oxo-2H-1,4-benzothiazine-4-acetic acid or the esters thereof. The specific derivatives herein are those wherein an alkoxy or hydroxy carbonylmethylene group is substituted at the 2-position of the ring. This class of compounds has been found to produce desirable growth regulating responses when applied to soybeans.

The compounds of the present invention may be represented by the structural formula

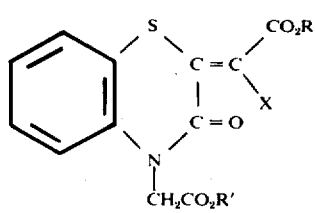

wherein R and R' are each independently hydrogen or alkyl of up to 3 carbon atoms, and X is hydrogen or -CO₂R. Preferred compounds of this invention are those wherein R = R' and X is hydrogen.

In order to prepare compounds of the above formula wherein X is hydrogen, bromoacetic acid or an alkyl ester thereof is reacted with 2-hydroxy- or a 2-alkoxy carbonylmethylene-3,4-dihydro-3-oxo-2H-1,4-benzothiazine. Appropriate choice of these starting materials will determine whether the product is a diacid, a diester or a mixed acid-ester. Further, the ester group or groups in such a product can be hydrolyzed to produce the diacid. The benzothiazine reactant is prepared by reacting o-aminothiophenol with acetylenedicarboxylic acid or its diesters in the manner taught by Chem. Pharm. Bull., Vol. 20, pp. 832–834 (1972).

In order to prepare compounds of the above formula wherein X is not hydrogen, 2-chloro-3,4-dihydro-3-oxo-2H-1,4-benzothiazine is heated with triethyl phosphite to yield 2-diethylphosphonyl-3,4-dihydro-3-oxo-2H-1,4-benzothiazine. The starting benzothiazine is obtained in the manner taught by Chem. Berichte, Vol. 56, pp. 578–587 (1923). The product so obtained is itself reacted with a dialkyl ketomalonate or ketomalonic (mesoxalic) acid to give the corresponding 2-di(alkoxy or hydroxycarbonyl)methylene benzothiazine. This last named material is then reacted with bromoacetic acid or an alkyl ester thereof as described above.

The following illustrative, non-limiting examples will further demonstrate to those skilled in the art the manner in which specific compounds of the invention can be prepared.

EXAMPLE I

A suitable reaction vessel is charged with 30.0 grams of 2-methoxycarbonylmethylene-3,4-dihydro-3-oxo-2H-1,4-benzothiazine in 1500 ml. of acetone. The mixture is heated to gentle refluxing, and there is added 30.0 grams of powdered potassium hydroxide, followed immediately by 21.0 grams of ethyl bromoacetate in a single portion. Refluxing is continued for about 5 minutes, after which the mixture is filtered while hot. The filtrate is then concentrated to about 600 ml., and a product is obtained as yellow crystals which are recrystallized from ethanol. The product is identified as ethyl 3,4-dihydro-2-methoxycarbonylmethylene-3-oxo-2H-1,4-benzothiazine-4-acetate, m.p. 164°–165.5°C. Elemental analysis gives 55.87 percent carbon, 4.83 percent hydrogen and 10.16 percent sulfur as against calculated values of 56.06 percent, 4.71 percent and 9.98 percent for $C_{15}H_{15}NO_5S$.

EXAMPLE II

A suitable reaction vessel is charged with 6.4-benzothiazine-grams of the product of Example I and 2.0 grams of sodium hydroxide in 50 ml. of ethanol and 100 ml. of water. The mixture is heated at reflux for about 2 hours. The yellow solution obtained is then cooled and acidified to pH 2 with concentrated hydrochloric acid. After about 10 minutes, the bright yellow solid which precipitates is collected by filtration, dried and recrystallized from 150 ml. of ethanol. The product obtained is 3,4-dihydro-2-hydroxycarbonylmethylene-3-oxo-2H-1,4-benxothiazine-4-acetic acid, m.p. 233°–235°C. (dec.). Elemental analysis gives 51.74 percent carbon, 3.34 percent hydrogen and 11.58 percent sulfur as against calculated values of 51.61 percent, 3.25 percent and 11.48 percent for $C_{12}H_9NO_5S$.

EXAMPLE III

The procedure described in Example I is followed except that 2-ethoxycarbonylmethylene-3,4-dihydro-3-oxo-2H-1,4-benzothiazine is employed as the starting reactant. The product, obtained as a fluffy yellow solid, is ethyl 3,4-dihydro-2-ethoxycarbonylmethylene-3-oxo-2H-1,4-benzothiazine-4-acetate, m.p. 149°–150.5°C. Elemental analysis gives 57.49 percent carbon, 5.15 percent hydrogen and 9.54 percent sulfur as against calculated values of 57.30 percent, 5.11 percent and 9.56 percent for $C_{16}H_{17}NO_5S$.

EXAMPLE IV

A stirred mixture of 26.5 grams of 2-chloro-3,4-dihydro-3-oxo-2H-1,4-benzothiazine and 101.0 ml. of triethyl phosphite is heated at about 100°C. A vigorous exothermic reaction occurs, and a clear orange solution is obtained. The solution is stirred at reflux for 1.5 hours, cooled to about 60°C., and diluted with 100 ml. of petroleum ether. Further cooling to room temperature, filtration of a pale yellow solid, and recrystallization from benzene/petroleum ether gives 2-diethoxyphosphinyl-3,4-dihydro-3-oxo-2H-1,4-benzothiazine, m.p. 134°–136°C.

To a stirred mixture of 6.02 grams of the above product and 3.5 grams of diethyl ketomalonate in 50 ml. of ethanol, there is added 20 ml. of a 1.0 N solution of sodium ethoxide in ethanol. A clear solution is obtained, and a yellow solid then precipitates. An additional 100 ml. of ethanol is added to the crystalline mass, and stirring is continued for about 30 minutes. The product, recovered by filtration and recrystallized from ethanol, is 2-di(ethoxycarbonyl)methylene-3,4-dihydro-3-oxo-2H-1,4-benzothiazine, m.p. 163°–163.5°C.

To a stirred, refluxing solution of 3.1 grams of this latter product in 150 ml. of acetone, there is added 2.5 grams of powdered potassium hydroxide followed immediately by 2.3 grams of ethyl bromoacetate. After 10 minutes of further refluxing, the mixture is filtered while hot, the filtrate is concentrated and the residue is treated with petroleum ether. Another filtration is followed by recrystallization, first from carbon tetrachloride/petroleum ether and then from ethanol. The product obtained as a yellow solid is ethyl 2-di(ethoxycarbonyl)-methylene-3,4-dihydro-3-oxo-2H-1,4-benzothiazine-4-acetate, m.p. 118°–120°C. Elemental analysis gives 56.08 percent carbon, 5.20 percent hydrogen and 7.93 percent sulfur as against calculated values of 56.00 percent, 5.19 percent and 7.87 percent for $C_{19}H_{21}NO_7S$.

As noted above, the compounds of this invention have been found to produce certain desirable, non-lethal, growth regulating responses when applied to soybean plants. In order to demonstrate such responses, a number of soybean plants are grown from seed in aluminum pans in a greenhouse. When these plants reach the primary leaf stage, they are sprayed with an aqueous solution of the test compound formulated with a small amount of surfactant. The treated plants are then grown for about 2 weeks, after which observations are made and compared with observations of untreated control plants. Similar tests are also conducted with the treatments being applied when the plants have reached the 3–4 trifoliate stage.

The compounds of Examples I and II are employed in these treatments at a number of rates from about 1.0 to about 6.0 pounds per acre. The most commonly observed responses were leaf alteration and/or distortion, stature or height reduction, enhanced pod set and inhibition of apical development. Other responses noted less frequently include axillary bud development, thick leaf texture and dark foliar color.

In addition, the compound of Example I was applied at rates of about 1.0 to 4.0 pounds per acre to soybeans grown in the field. These soybean plants were of the Williams variety and were seeded in 20 inch rows at a rate of 150,000 seeds per acre. Foliar spray application was made at the early flowering stage, and the test compound was formulated as a 25 percent wettable powder. Observations made 4 weeks after treatment showed leaf alteration and/or distortion, an altered canopy and dark foliar color. At harvest, it was found that seed size was about the same as the untreated control. Bean yield was below control at the 4.0 pound per acre rate, but showed a small increase over control at 1.0 pound. At 2.0 pounds per acre, yield was increased about 6 percent.

While the invention has been described herein with regard to certain representative examples for purpose of illustrating its practice, it is not to be construed as limited thereto. Those skilled in the art will readily recognize the variations and modifications which can be made without departing from the spirit and scope of the invention.

What is claimed is:

1. A compound of the formula

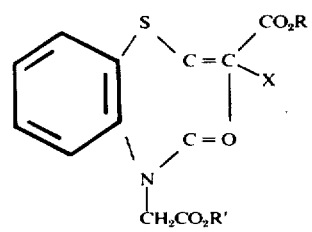

wherein R and R' are each independently hydrogen or alkyl of up to 3 carbon atoms, and X is hydrogen or $-CO_2R$.

2. A compound as defined in claim 1 wherein X is hydrogen, and R and R' are the same.

3. A compound as defined in claim 2 wherein R and R' are hydrogen.

4. A compound as defined in claim 2 wherein R and R' are ethyl.

5. A compound as defined in claim 2 wherein R and R' are methyl.

6. A compound as defined in claim 1 wherein X is hydrogen, R is methyl and R' is ethyl.

7. A compound as defined in claim 1 wherein X is $-CO_2R$.

8. A compound as defined in claim 7 wherein R and R' are ethyl.

9. A compound as defined in claim 7 wherein R and R' are methyl.

10. A compound as defined in claim 7 wherein R and R' are hydrogen.

* * * * *